United States Patent Office 3,576,854
Patented Apr. 27, 1971

3,576,854
METHOD OF OPTICALLY RESOLVING RACEMIC BASES AND OPTICALLY ACTIVE N-(1-PHENYLETHYL)-CARBAMYL CARBOXYLIC ACIDS FOR USE IN SAID METHOD
Ernst Felder and Davide Pitre, Milan, Italy, assignors to Bracco Industria Chimica, Societa per Azioni, Milan, Italy
No Drawing. Filed Feb. 25, 1969, Ser. No. 802,204
Claims priority, application Switzerland, Mar. 15, 1968, 3,917/68
Int. Cl. C07c 103/34
U.S. Cl. 260—518         8 Claims

ABSTRACT OF THE DISCLOSURE

The optically active forms of acids of the formula

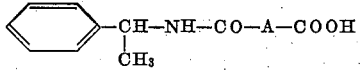

wherein A is a single carbon-to-carbon bond, a radical of the formula —$(CH_2)_n$— ($n$ being an integer between 1 and 4), the radical —CH=CH—, or phenylene are readily available from inexpensive starting materials and well suited for forming disastereoisomers with racemic bases. The diastereoisomers may be fractionated by crystallization in a conventional manner and decomposed to isolate the optically active forms of the base. The acid is recovered in good yield.

This invention relates to the optical resolution of racemic bases, and to optically active organic acids for use in the resolution.

The symbols employed hereinafter for designating steric configuration of isomers is that of Cahn et al., as set forth in Experientia XII, No. 3, pages 81 to 124 (1956), and widely accepted in this art.

The optical resolution of a racemic mixture of an optically active base by salt formation with an optically active acid and subsequent fractional crystallization of the resulting diastereoisomers is well known, having been proposed first by Louis Pasteur. The optically active acids commonly employed heretofore in the known procedure were naturally occurring substances, or derivatives of such natural substances, and only one enantiomorph was available from such sources, such as (S)-malic acid, (R)-mandelic acid, (+)-camphoric acid, and the like.

When the usual optically active acids are employed in the resolution of a racemic base, only the less soluble diastereoisomer is recovered in relatively pure form by crystallization, whereas the mother liquor is enriched in the other diastereoisomer, but still contains substantial amounts of the less soluble isomer which is removed only with difficulty. Purification of the more soluble diastereoisomer is relatively simple if both optically active forms of the optically active acid are available, but both enantiomorphs of a suitable acid were available heretofore only at relatively great expense.

The primary object of this invention is the provision of a group of optically active organic acids which are readily prepared at low cost from commonly available materials.

The two enantiomorphs of 1-phenylethylamine are commonly employed for the resolution of racemic modifications of organic acids and are available at low cost. We now have found that they are conveniently converted in good yields to the corresponding, optically active acids of the formula

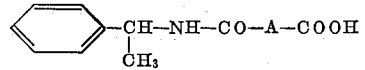

wherein A is a single carbon-to-carbon bond, a radical of the formula $(CH_2)_n$—, $n$ being an integer between 1 and 4, the radical —CH=CH—, or phenylene, by reaction with the corresponding dicarboxylic acids

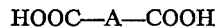

HOOC—A—COOH or reactive derivatives of the latter. Suitable reactive derivatives include the cyclic anhydrides, monoacyl halides, monoesters, monoester-acyl halides of the dicarboxylic acids, and other methods of preparing the N-(1-phenylethyl)-carbamyl carboxylic acids of the invention will readily suggest themselves to those skilled in the art.

Because both enantiomorphs of the optically active acids of the invention are equally available, the enantiomorphs of a racemic base can be recovered separately in equally pure states in a simple manner, as is known in itself and will further be illustrated as the disclosure proceeds.

The optically active acids of the invention are chemically very stable and resist decomposition by acids as well as by alkalis. The disastereoisomeric salts recovered when the acids of the invention are combined with a base to be resolved may therefore be decomposed by means of strong acids or bases and the optically active acids recovered from the decomposition mixtures in good yields for further use.

The acids of the invention are thus superior in their stability to the monoesters of dicarboxylic acids with optically active alcohols, as disclosed in Pat. No. 2,240,318, which are hydrolyzed to a significant extent under the conditions necessary for decomposing the diastereoisomeric salts.

The optically active acids of the invention do not tend to recemize under even severe operating conditions. Racemic bases may therefore be resolved by means of these acids, and the optically active bases recovered in a state of high optical purity even when the resolution process requires the exposure of the reactants to relatively high temperatures over extended periods, or to similar conditions conducive to the racemization of less stable optically active acids.

(+)-1-phenylethylamine, which is one of the raw materials for preparing the optically active acids of this invention is available at particularly low cost as a byproduct in the preparation of optically active pantothenic acid from the racemic acid by means of (—)-1-phenylethylamine.

The following examples are further illustrative of the invention, but it will be understood that it is not limited to the examples.

EXAMPLE 1

50 g. succinic anhydride (0.5 mole) were dissolved in 800 ml. boiling benzene. A solution of 60.6 g. (R)(+)-1-phenylethylamine (0.5 mole) in 100 ml. benzene was added drop by drop with stirring, causing an exothermic reaction. After the amine solution had been added, the mixture was refluxed briefly, then permitted to cool while stirring was continued. An aliquot was withdrawn and caused to crystallize by rubbing with a glass rod. The seed crystals so obtained were added to the bulk of the reaction mixture to induce crystallization of the amide.

107 g. (R)(+)-N-(1-phenylethyl)-succinamic acid of melting point 99° C. were obtained (97% yield). When recrystallized from a mixture of 580 ml. ethyl acetate and 300 ml. hexane, the pure product melted at 100° C. and weighed 86 g. (77.5% yield). $[\alpha]_D^{20}=+112.05°$ (c.=2% in ethanol). The specific rotation was reduced by 0.27° by a temperature increase of 1° C. over the range from 15 to 30° C.

The procedure described above was repeated with equimolecular amounts of succinic anhydride (30 g.) and (S)(−)-1-phenylethylamine (36.3 g.) in 450 ml. benzene, and 49.6 g. (S)(−)-N-(1-phenylethyl)-succinamic acid (74% yield) were obtained, having a melting point of 99° C. $[\alpha]_D^{20}=-111.9°$ (c.=2% in ethanol). The specific rotation was reduced by 0.27° by a temperature increase of 1° C. over the range from 15 to 30° C.

*Microanalysis.*—Calcd (percent): 65.12 C; 6.83 H; 6.33 N. Found (percent): 64.89 C; 6.92 H; 6.32 N.

EXAMPLE 2

13.8 g. maleic anhydride (0.14 mole) were dissolved in 110 ml. hot benzene, and 17 g. (0.14 mole) (R)(+)-1-phenylethylamine were added drop by drop. The resulting reaction was strongly exothermic. After it had subsided, the reaction mixture was cooled to ambient temperature, and 60 ml. hexane were added. Crystallization was induced by scraping the inner wall of the reaction vessel with a glass rod. The crude crystalline material weighed 30.5 g. and melted at 107° C.

It was recrystallized from 150 ml. ethyl acetate and 130 ml. hexane. The pure (R)(+)-N-(1-phenylethyl)-maleamic acid had a melting point of 117° C. and weighed 29.9 g. (97% yield). $[\alpha]_D^{20}=+206.6°$ (c.=2% in ethanol). The specific rotation was reduced by 0.7° by a temperature increase of 1° C. between 15 and 30° C.

*Microanalysis.*—Calc'd (percent): 65.75 C; 5.97 H; 6.39 N. Found (percent): 65.53 C; 5.86 H; 6.36 N.

When (S)(−)-phenylethylamine was substituted for the enantiomorph in the above procedure, there were obtained 25.7 g. (S)(−)-N-(1-phenylethyl)-maleamic acid (83% yield), M.P. 117° C. $[\alpha]_D^{21}=-219.8°$ (c.=2% in ethanol). The specific rotation was reduced by 0.8° when the temperature was increased by 1° C.

EXAMPLE 3

29.7 g. phthalic anhydride (0.2 mole) were suspended in 330 ml. boiling benzene, and 24.2 g. (R)(+)-1-phenylethylamine (0.2 mole) were added over a period of 10 minutes. The mixture was refluxed for an additional 5 to 10 minutes, and the clear solution so obtained was permitted to cool. When the inner wall of the glass flask employed as a reaction vessel was scraped with a glass rod, crystallization was induced. The crude crystalline product was recovered (42.4 g, M.P. 133° C.), and was recrystallized to 37.6 g. pure (R)(+)-N-(1-phenylethyl)-o-phthalamic acid (70% yield).

The pure compound had a melting point of 134° C. $[\alpha]_D^{21}=+47.40°$ (c.=2% in ethanol). The specific rotation decreased by 0.2° with a temperature increase of 1° C.

*Microanalysis.*—Calc'd (percent): 71.36 C; 5.62 H; 5.20 N. Found (percent): 71.10 C; 5.79 H; 5.10 N.

The (S)(−)-N-(1-phenylethyl)-phthalamic acid was obtained in an analogous manner from 24.2 g. (S)(−)-1-phenylethylamine in an amount of 43.5 g. (81% yield). M.P. 134° C. $[\alpha]_D^{21}=-46.90°$ (c.=2% in ethanol).

The same and analogous optically active compounds were prepared from the two optically active isomers of 1-phenylethylamine with the ethyl esters of the acyl monochlorides of succinic, malonic, glutaric, adipic, phthalic, isophthalic, terephthalic, and oxalic acid; also with the monoethyl esters of malonic, glutaric, adipic, phthalic, isophthalic, terephthalic, and oxalic acid; also the acyl monochlorides of malonic, glutaric, adipic, phthalic, isophthalic, and terephthalic acid; and with diethyl oxalate in a manner obvious from the preceding examples and with similar yields.

One or several of the optically active N-(1-phenylethyl)-carbamylcarboxylic acids so produced were used successfully in the optical resolution of all racemic organic bases which we tested, and of which those referred to in the following examples are merely representative.

EXAMPLE 4

40.35 g. (R)(+)-N-(1-phenylethyl)-o-phthalamic acid (0.15 mole) were dissolved in 300 ml. methylethylketone, and 20.25 g. (R)(S)-1-phenyl-2-aminopropane (0.15 mole) were added. The mixture was briefly heated to its boiling point, and then cooled to about 50°–60° C. Crystallization was induced by scraping the inner wall of the reaction vessel with a glass rod and permitted to proceed overnight at ambient temperature.

The precipitated salt of (S)(+)-1-phenyl-2-aminopropane with (R)(+)-N-(1-phenylethyl)-o-phthalamic acid was filtered off with suction, and was recrystallized from 145 ml. methylethylketone. The yied of optically pure salt was 23.5g. (78%). M.P. 143° C. $[\alpha]_D^{20}=+2.7°$ (2% in ethanol).

The combined mother liquors were evaporated to dryness. The residue was dissolved in 40 ml. methanol, diluted with water, strongly acidified with hydrochloric acid, and extracted with methylene chloride. The aqueous phase was then made strongly alkaline with potassium hydroxide and extracted with methylene chloride to recover an optically impure (R)(−)-1-phenyl-2-aminopropane by fractional distillation of the extract. The yield was 9.5 g. (76%). B.P. 85° C. at 14 mm. $[\alpha]_D^{20}=-17.67°$ (2% in benzene). The optical purity of the base was 50%.

(R)(+)-N-(1-phenylethyl)-o-phthalamic acid was reclaimed from the first methylene chloride extract in an obvious manner in a yield of 70%.

The 23.5 g. salt of (S)(+)-1-phenyl-2-aminopropane with (R)(+)-N-(1-phenylethyl)-o-phthalamic acid were dissolved in 65 ml. methanol and decomposed in the same manner as the residue of the mother liquor. The free (S)(+)-1-phenyl-2-aminopropane obtained was dissolved in 30 ml. anhydrous ethanol, and a slight excess of sulfuric acid (2.9 g.=0.03 mole) in 15 ml. ethanol was added to precipitate the neutral sulfate of (S)(+)-1-phenyl-2-aminopropane.

The yield was 6.85 g. (64.5%). M.P. appr. 300° C. $[\alpha]_D^{20}=+22.1°$ (c.=2% in water). The observed properties are in good agreement with the Merck Index, 8th ed. page 335, which lists the melting point of dextro-amphetamine sulfate as being more than 300° C., $[\alpha]_D^{20}=+21.8°$.

(R)(+)-N-(1-phenylethyl)-o-phthalamic acid was recovered from the methylene chloride extract as described above in a yield of 70%.

9.1 g. optically impure (R)(−)-1-phenyl-2-aminopropane were converted to the crystalline salt with 17.9 g. (S)(−)-N-(1-phenylethyl)-o-phthalamic acid in 150 ml. methylethylketone as described above. When recrystallized from 100 ml. methylethylketone, the salt weighed 15.8 g. (81% yield) and had a melting point of 143° C. It was optically pure, $[\alpha]_D^{20}=-2.7°$ (2% in ethanol).

14.5 g. of the salt were converted to (R)(−)-1-phenyl-2-aminopropane sulfate in the manner described above. The yield was 4.5 g. (68%). M.P. about 300° C. $[\alpha]_D^{19}=-22.2°$ C. The (S)(−)-N-(1-phenylethyl)-o-phthalamic acid was recovered with a yield of 72%. M.P. 133° C. $[\alpha]_D^{19}=-46.0°$.

EXAMPLE 5

53.4 g. (S)(−)-N-1-(phenylethyl)-succinamic acid (0.25 mole) in 400 ml. methylethylketone were mixed with an equimolecular amount of 22.8 p. (S)(R)-2-aminobutanol in 50 ml. methylethylketone. The mixture was briefly heated to a boil and permitted to cool to 50°–60° C., whereupon crystallization was initiated by scraping with a glass rod and permitted to proceed for two days at room temperature. The crystalline precipitate was recovered and recrystallized from 160 ml. methylethylketone. The optically pure salt (S)(+)-2-aminobutanol with the optically active succinamic acid derivative weighed 25 g. (67% yield). M.P. 115° C.

$$[\alpha]_D^{21} = -59.42°$$

(2% in ether).

The mother liquor was evaporated to dryness, and the residue was dissolved in 80 ml. water. The salt was decomposed by passing the solution over a strongly basic ion exchange resin column in a conventional manner. The eluate was evaporated to remove the water, and the residual, optically impure (R)(−)-2-aminobutanol was taken up in ether and dried. The solvent was evaporated, and the residue was distilled in a vacuum. B.P. 80° C. at 14 mm. Hg $[\alpha]_D^{20} = -5.276°$. Optical purity 51%. Yield: 80%, based on the (R)(−)-2-aminobutanol present.

17.1 g. of the optically impure material (0.193 mole) were dissolved in 200 ml. methylethylketone and were converted to the crystalline salt with an equimolecular amount (43 g.) of (R)(+)-N-(1-phenylethyl)-succinamic acid in the manner described in Example 4. The recrystallized salt weighed 34 g. for a 76% yield based on the (R)(−)-isomer content of the base employed as a starting material. M.P. 115° C. $[\alpha]_D^{19} = +59.55°$.

It was dissolved in a little water and decomposed by passage over a column of strongly basic ion exchange resin, and the (R)(−)-2-aminobutanol was recovered from the residue of the evaporated eluate by mixing with ether, drying of the ether solution, evaporation, and distillation, as described above.

The N-(1-phenylethyl)-succinamic acid was eluted from the column in the form of its sodium salt by means of a strong aqueous sodium chloride solution, and was precipitated from the eluate upon acidification. Recovery was practically complete.

The optically pure salt of (S)(−)-N-(1-phenylethyl)-succinamic acid with (S)(+)-2-aminobutanol was similarly decomposed into the constituents by means of the strongly basic ion exchange resin. The (S)(+)-2-aminobutanol recovered weighed 6.05 g. (82% yield). B.P. 80° C. at 14 mm. Hg $[\alpha]_D^{20} = +10.12°$. The (S)(−)-N-(1-phenylethyl)-succinamic acid recovered weighed 17.25 g. (96.5% yield) and had a melting point of 100° C. $[\alpha]_D^{20} = -111.9°$ C.

EXAMPLE 6

A solution of 9.1 g. (S)(−)-N-(1-phenylethyl)-succinamic acid (0.041 mole) in 300 ml. ethyl acetate was mixed with an equimolecular amount (8.7 g.) (R)(S)-threo-1-p-nitrophenyl-2-aminopropane-1,3-diol. The mixture was briefly heated to a boil and then permitted to cool to approximately 50° to 60° C. Seed crystals were prepared from an aliquot as described above and added to the bulk of the supercooled solution to induce crystallization. The mixture was left to stand overnight at ambient temperature, and the crystals formed were then recovered and purified by suspending them in several changes of boiling ethyl acetate.

The crude salt of (S)(−)-N-(1-phenylethyl)-succinamic acid with 1(R),2(R)-(−)-threo-1-p-nitrophenyl-2-aminopropane-1,3-diol had a melting point of 112°–113° C. The purified material weighed 5.8 g. (65% yield) and melted at 122° C. $[\alpha]_D^{20} = -63.1°$ (2% in ethanol).

The mother liquor was evaporated to dryness, the residue was taken up in water and decomposed with hydrochloric acid for recovery of the (S)(−)-N-(1-phenylethyl)-succinamic acid. Optically impure 1(S),2(S)-(+)-threo-1-p-nitrophenyl-2-aminopropane-1,3-diol was obtained from the acid aqueous liquid by addition of sodium hydroxide in an amount of 3.9 g. (78% yield). M.P. 145°–150° C. $[\alpha]_D^{20} = +16.7°$ (1.5% in methanol). Optical purity 74%.

3.4 g. of the optically impure compound (0.016 mole) were mixed with a solution of 3.54 g. (R)(+)-N-(1-phenylethyl)-succinamic acid in 130 ml. ethyl acetate, and the salt so formed was recovered and purified as described above with reference to the diastereoisomer. Yield: 5.45 g. (87%). M.P. 121° C. $[\alpha]_D^{19} = +62.2°$ (2% in ethanol).

4.33 g. optically pure 1(R), 2(R)-(−)-threo-1-p-nitrophenyl-2-aminopropane-1,3-diol salt of (S)(−)-N-(1-phenylethyl)-succinamic acid (0.01 mole) were dissolved in 20 ml. water, the solution was acidified with 10 ml. concentrated hydrochloric acid, and was extracted with methylene chloride. 1(R),2(R)-(−)-threo-1-p-nitrophenyl-2-aminopropane-1,3-diol was precipitated from the acidic aqueous phase by means of sodium hydroxide, and was recovered in an amount of 1.9 g. (90% yield). M.P. 162° C. $[\alpha]_D^{20} = -22.6°$ (1.5% in methanol).

The methylene chloride extract yielded 1.4 g. (63%) of the (S)(−)-N-(1-phenylethyl)-succinamic acid. M.P. 99° C. $[\alpha]_D^{19} = -110.4°$ (2% in ethanol).

The optically pure salt of 1(S),2(S)-(+)-threo-1-p-nitrophenyl-2-aminopropane-1,3-diol with (R)(+)-N-(1-phenylethyl)succinamic acid, obtained as described above, was decomposed by acidification, extraction, and neutralization followed by filtration of the pure base which was recovered in a yield of 83% and melted at 163° C. when recrystallized from water. $[\alpha]_D^{19} = +22.6°$ (1.5% in methanol).

EXAMPLE 7

(R)(+)-1-phenylethylamine and (S)(−)-1-phenylethylamine were prepared in the following sequence of steps:

33.15 g. (S)(−)-N-(1-phenylethyl)-succinamic acid and 18.15 g. (R)(S)-1-phenylethylamine were jointly dispersed in 400 ml. methylethylketone. The salt of (R)(+)-1-phenylethylamine with (S)(−)-N-(1-phenylethyl)succinamic acid was thereby precipitated in crystalline form. When recrystallized repeatedly from methylethylketone, it weighed 18.5 g. (72% yield). M.P. 134° C. $[\alpha]_D^{20} = -52.6°$.

The mother liquor was evaporated to dryness, and the residual salt was decomposed into the components, as described above, whereby 10.1 g. optically impure (S)(−)-1-phenylethylamine (90% yield, 50% purity) and (S)(−)-N-(1-phenylethyl)-succinamic acid in a yield of 68% were recovered.

The optically impure (S)(−)-1-phenylethylamine was combined to the crystalline salt with 18.5 g. (R)(+)-N-(1-phenylethyl)-succinamic acid, as described above, and the optically pure salt was recovered in an amount of 18.8 g. (89.5% yield). M.P. 134° C. $[\alpha]_D^{20} = +52.5°$.

18.2 g. optically pure salt of (R)(+)-1-phenylethylamine with (S)(−)-N-(1-phenylethyl)-succinamic acid were decomposed into the components, and 4.8 g. optically pure base (74.5% yield) of B.P. 72° C. at 12 mm. Hg were obtained. $[\alpha]_D^{20} = +40.1°$ (d.=0.95). (S)(−)-1-phenylethylamine was recovered from its optically pure salt with (R)(+)-N-(1-phenylethyl)-succinamic acid in a yield of 84%. B.P. 74° C. at 14 mm. $[\alpha]_D^{17} = -40.0°$ (d.=0.95). The optically active N-(1-phenylethyl)-succinamic acid isomers were also recovered in good yields as described above.

1-phenylethylamine is abundantly available by synthesis at low cost. It can be resolved into the enantiomorphs in the manner described above, and the optically active isomers have therefore been used extensively heretofore for resolving racemic mixtures of optically active acid isomers. The present invention provides an equally useful reagent for the resolution of racemic bases.

What is claimed is:

1. An optically active compound of the formula

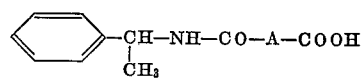

wherein A is a single carbon-to-carbon bond, a radical of the formula —$(CH_2)_n$—, $n$ being an integer between 1 and 4, the radical —CH=CH—, or phenylene.

2. A compound as set forth in claim 1, wherein A is —$CH_2$—$CH_2$—, the compound being in the (R)(+) or (S)(−) form.

3. A compound as set forth in claim 1, wherein A is —CH=CH—, the compound being in the (R)(+) or (S)(−) form.

4. A compound as set forth in claim 1, wherein A is o-phenylene, the compound being in the (R)(+) or (S)(−) form.

5. In a method of optically resolving a racemic base by forming a salt of said base with an optically active organic acid, whereby a mixture of diastereoisomers is obtained, and fractionating said mixture to recover at least one of the diastereoisomers in optically purified form, the improvement which consists in said optically active organic acid being a compound as defined in claim 1.

6. In a method as set forth in claim 5, A in said compound being —$CH_2$—$CH_2$—, the compound being in the (R)(+) or (S)(−) form.

7. In a method as set forth in claim 5, A in said compound being —CH=CH—, the compound being in the (R)(+) or (S)(−) form.

8. In a method as set forth in claim 5, A in said compound being o-phenylene, the compound being in the (R)(+) or (S)(−) form.

References Cited

UNITED STATES PATENTS 3,362,959  1/1968  Cocker et al. _____ 260—518

LEWIS GOTTS, Primary Examiner

L. A. THAXTON, Assistant Examiner

U.S. Cl. X.R.

260—501.11, 570.8R